(12) United States Patent
Agrawal et al.

(10) Patent No.: US 12,045,953 B2
(45) Date of Patent: Jul. 23, 2024

(54) EXTRACTING REGION OF INTEREST FROM SCANNED IMAGES AND DETERMINING AN ASSOCIATED IMAGE TYPE THEREOF

(71) Applicant: Tata Consultancy Services Limited, Mumbai (IN)

(72) Inventors: Amit Kumar Agrawal, Kolkata (IN); Mantu Prasad Gupta, Mumbai (IN); Tanmay Suhas Jagtap, Mumbai (IN); Devang Jagdishchandra Patel, Mumbai (IN); Pushp Kumar Jain, Pune (IN); Dinesh Yadav, Mumbai (IN); Prabhat Ranjan Mishra, Mumbai (IN); Rajdeep Chatterjee, Mumbai (IN); Prosenjit Mondal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 414 days.

(21) Appl. No.: 17/393,081

(22) Filed: Aug. 3, 2021

(65) Prior Publication Data
US 2022/0343464 A1 Oct. 27, 2022

(30) Foreign Application Priority Data
Mar. 27, 2021 (IN) .............................. 202121013778

(51) Int. Cl.
*G06T 3/4076* (2024.01)
*G06T 5/20* (2006.01)
(Continued)

(52) U.S. Cl.
CPC .............. *G06T 3/4076* (2013.01); *G06T 5/20* (2013.01); *G06T 5/73* (2024.01); *G06T 7/11* (2017.01);
(Continued)

(58) Field of Classification Search
CPC .... G06T 3/40; G06T 3/4076; G06T 5/00; G06T 5/003; G06T 5/20; G06T 7/11;
(Continued)

(56) References Cited

U.S. PATENT DOCUMENTS 5,555,556 A 9/1996 Ozaki
7,277,580 B2 * 10/2007 Xu ........................... G06T 7/136
382/173

(Continued)

FOREIGN PATENT DOCUMENTS

KR 20040092561 A * 11/2004 ............... G06T 1/00
WO WO1999057677 A1 11/1999
WO WO2020212619 A1 10/2020

OTHER PUBLICATIONS

Wira Satyawan et al., "Citizen Id Card Detection using Image Processing and Optical Character Recognition," Journal of Physics, Jun. 2019, vol. 1235, IOP Science, https://iopscience.iop.org/article/10.1088/1742-6596/1235/1/012049/pdf.

(Continued)

*Primary Examiner* — Edward F Urban
*Assistant Examiner* — Benedict E Lee
(74) *Attorney, Agent, or Firm* — FINNEGAN, HENDERSON, FARABOW, GARRETT & DUNNER, LLP

(57) ABSTRACT

ROI (Region of Interest) detection is an important step in extracting relevant information from a document image. Such images are very high-resolution images in nature and size of images is in order of megabytes, which makes text detection pipeline very slow. Traditional methods detect and extract ROI from images, but these work only for specific image types. Other approaches include deep learning (DL) based methods for ROI detect which need intensive training and require high end computing infrastructure/resources with graphical processing unit (GPU) capabilities. Systems (Continued)

and methods of the present disclosure perform ROI extraction by partitioning input image into parts based on its visual perception and then classify the image in first or second category. Region of interest is extracted from a resized image based on the classification by applying image processing techniques. Further, the system determines whether the input image is a pre-cropped image or a normal scanned image.

15 Claims, 13 Drawing Sheets

(51) Int. Cl.
   G06T 5/73        (2024.01)
   G06T 7/11        (2017.01)
   G06T 7/13        (2017.01)
   G06T 7/136       (2017.01)
   G06T 7/90        (2017.01)
   H04N 1/00        (2006.01)

(52) U.S. Cl.
   CPC ............. *G06T 7/13* (2017.01); *G06T 7/136* (2017.01); *G06T 7/90* (2017.01); *H04N 1/00167* (2013.01); *G06T 2207/10024* (2013.01); *G06T 2207/20032* (2013.01); *G06T 2207/20104* (2013.01); *G06T 2207/30176* (2013.01)

(58) Field of Classification Search
   CPC .. G06T 7/13; G06T 7/136; G06T 7/90; G06T 2207/10024; G06T 2207/20032; G06T 2207/20104; G06T 2207/30176; H04N 1/00; H04N 1/00167; H04N 1/00196; H04N 1/00201; H04N 23/682; H04N 23/70; H04N 23/80; H04N 5/253; H04N 25/68; G06V 10/25; G06V 10/56; G06V 10/98; G06V 10/993
   See application file for complete search history.

(56) References Cited

U.S. PATENT DOCUMENTS

| | | | |
|---|---|---|---|
| 7,907,778 B2* | 3/2011 | Xiao | G06T 7/11 |
| | | | 382/172 |
| 10,169,877 B2* | 1/2019 | Palaniyappan | H04N 1/10 |
| 10,331,966 B1* | 6/2019 | Pribble | G06V 30/414 |
| 10,765,890 B2* | 9/2020 | Sun | G06T 5/50 |
| 10,796,145 B2* | 10/2020 | Anisimovskiy | G06V 30/413 |
| 10,970,535 B2* | 4/2021 | Mallick | G06V 30/412 |
| 11,144,752 B1* | 10/2021 | Castelblanco Cruz | |
| | | | G06T 7/194 |
| 11,475,243 B2* | 10/2022 | Zhang | G06T 7/174 |
| 11,521,305 B2* | 12/2022 | Xu | H04N 9/646 |
| 2023/0156349 A1* | 5/2023 | Choe | G06T 5/20 |
| | | | 348/231.6 |

OTHER PUBLICATIONS

Albert Berenguel et al., "e-Counterfeit: a mobile-server platform for document counterfeit detection," Computer Vision and Pattern Recognition, Aug. 2017, Arxiv, https://arxiv.org/pdf/1708.06126.pdf.

* cited by examiner

EXTRACTING REGION OF INTEREST FROM SCANNED IMAGES AND DETERMINING AN ASSOCIATED IMAGE TYPE THEREOF

PRIORITY CLAIM

This U.S. patent application claims priority under 35 U.S.C. § 119 to: India Application No. 202121013778, filed on Mar. 27, 2021. The entire contents of the aforementioned application are incorporated herein by reference.

TECHNICAL FIELD

The disclosure herein generally relates to image processing techniques, and, more particularly, to extracting region of interest from scanned images and determining an associated image type thereof.

BACKGROUND

ROI (Region of Interest) detection is an important step in extracting relevant information from a document image. Scanned image typically contains actual document in a very small region compared to the whole image area. Only a small part of the image contains actual relevant information which is Region of Interest (ROI) in context. Such images are very high-resolution images in nature and the size of images is in order of megabytes, which makes the text detection pipeline very slow. Conventional image processing-based solutions are not able to detect exact document region as a region of interest in automated way. There are few traditional methods which detect and extract region of interest from images, but these work only for specific image types. Other approaches include deep learning (DL) based methods for ROI detect which need intensive training (with huge data) to perform with good accuracy. These solutions are resource hungry and require high end computing infrastructure with graphical processing unit (GPU) capabilities.

SUMMARY

Embodiments of the present disclosure present technological improvements as solutions to one or more of the above-mentioned technical problems recognized by the inventors in conventional systems. For example, in one aspect, there is provided a processor implemented method for extracting region of interest from scanned images and determining an associated image type thereof. The method comprises: obtaining, via one or more hardware processors, an input comprising a scanned image; resizing, via the one or more hardware processors, the obtained scanned image to obtain a resized image; partitioning, via the one or more hardware processors, the resized image into a pre-defined number of parts; classifying, via the one or more hardware processors, the resized image into a first class or a second class based on a property associated with a foreground and a background comprised in the pre-defined number of parts of the resized image to obtain a classified image; based on the classified image, obtaining a region of interest by performing one of: (i) converting, via the one or more hardware processors, the scanned image into a gray scale image and resizing the gray scale image to obtain a resized gray scale image; (ii) applying, via the one or more hardware processors, a first filtering technique on the resized gray scale image to obtain a first filtered image; (iii) applying, via the one or more hardware processors, a second filtering technique on the resized gray scaled image to obtain a second filtered image; (iv) obtaining, via the one or more hardware processors, an output image based on an intersection of the first filtered image and the second filtered image, wherein the output image comprises a plurality of black areas and a white area; (v) performing, via the one or more hardware processors, a first comparison of each black area from the plurality of black areas and the white area comprised in the obtained output image; and (vi) extracting, via the one or more hardware processors, the region of interest from the obtained output image based on the first comparison; or converting, via the one or more hardware processors, each part from the pre-defined number of parts into a Hue Saturation Value (HSV) space; calculating, via the one or more hardware processors, a mode color intensity of H channel and a mode color intensity of V channel comprised in the HSV space of each part in the pre-defined number of parts; performing, via the one or more hardware processors, a clustering technique on the mode color intensity of H channel and the mode color intensity of V channel to obtain a plurality of clusters; performing, via the one or more hardware processors, a second comparison of (i) one or more corner points of each cluster from the plurality of clusters and (ii) one or more corner points of the scanned image; and selecting, via the one or more hardware processors, a cluster from the plurality of clusters based on the second comparison, wherein the selected cluster serves as the region of interest, and wherein one or more parts of the pre-defined number of parts form the selected cluster.

In an embodiment, the step of classifying, via the one or more hardware processors, the resized image into a first class or a second class comprises: calculating an intensity of the grey channel space for each part and computing a difference in the intensities across the predefined number of parts; performing a third comparison of the difference with a predefined threshold; classifying, based on the third comparison, the resized image into the first class or the second class to obtain the classified image.

In an embodiment, the step of extracting, via the one or more hardware processors, a region of interest from the obtained output image based on the first comparison comprises: concatenating two or more black areas from the plurality of black areas based on the first comparison to obtain a consolidated black area, wherein the two or more black areas are concatenated based on a corresponding presence within a predefined range, wherein the consolidated black area serves as the region of interest.

In an embodiment, the plurality of clusters is obtained based on an intersection of (i) an output of the clustering technique performed on the mode color intensity of H channel and (ii) an output of the clustering technique performed on the mode color intensity of V channel.

In an embodiment, the step of selecting a cluster from the plurality of clusters is based on there being (i) a single common corner point or (ii) no common corner point.

In an embodiment, the method further comprises determining, via the one or more hardware processors, a type of the scanned image as a pre-cropped scanned image or a normal scanned image based on the region of interest.

In an embodiment, the step of determining, via the one or more hardware processors, a type of the scanned image a pre-cropped scanned image or a normal scanned image is based on a fourth comparison of (i) a difference between the region of interest and the scanned image and (ii) a predetermined threshold.

In another aspect, there is provided a system for extracting region of interest from scanned images and determining an associated image type thereof. The system comprises: a memory storing instructions; one or more communication interfaces; and one or more hardware processors coupled to the memory via the one or more communication interfaces, wherein the one or more hardware processors are configured by the instructions to: obtain an input comprising a scanned image; resize the obtained scanned image to obtain a resized image; partition the resized image into a pre-defined number of parts; classify the resized image into a first class or a second class based on a property associated with a foreground and a background comprised in the pre-defined number of parts of the resized image to obtain a classified image; based on the classified image, obtain a region of interest by performing one of: (i) converting the scanned image into a gray scale image and resizing the gray scale image to obtain a resized gray scale image; (ii) applying a first filtering technique on the resized gray scale image to obtain a first filtered image; (iii) applying a second filtering technique on the resized gray scaled image to obtain a second filtered image; (iv) obtaining an output image based on an intersection of the first filtered image and the second filtered image, wherein the output image comprises a plurality of black areas and a white area; (v) performing a first comparison of each black area from the plurality of one or more black areas and the white area comprised in the obtained output image; and (vi) extracting the region of interest from the obtained output image based on the first comparison; or converting each part from the pre-defined number of parts into a Hue Saturation Value (HSV) space; calculating a mode color intensity of H channel and a mode color intensity of V channel comprised in the HSV space of each part in the pre-defined number of parts; performing a clustering technique on the mode color intensity of H channel and the mode color intensity of V channel to obtain a plurality of clusters; performing a second comparison of (i) one or more corner points of each cluster from the plurality of clusters and (ii) one or more corner points of the scanned image; and selecting a cluster from the plurality of clusters based on the second comparison, wherein the selected cluster serves as the region of interest, and wherein one or more parts of the pre-defined number of parts form the selected cluster.

In an embodiment, the one or more hardware processors classify the resized image into a first class or a second class by: calculating an intensity of the grey channel space for each part and computing a difference in the intensities across the predefined number of parts; performing a third comparison of the difference with a predefined threshold; classifying, based on the third comparison, the resized image into the first class or the second class to obtain the classified image.

In an embodiment, the step of extracting, via the one or more hardware processors, a region of interest from the obtained output image based on the first comparison comprises: concatenating two or more black areas from the plurality of black areas based on the first comparison to obtain a consolidated black area, wherein the two or more black areas are concatenated based on a corresponding presence within a predefined range, wherein the consolidated black area serves as the region of interest.

In an embodiment, the plurality of clusters is obtained based on an intersection of (i) an output of the clustering technique performed on the mode color intensity of H channel and (ii) an output of the clustering technique performed on the mode color intensity of V channel.

In an embodiment, the cluster is selected from the plurality of clusters based on there being (i) a single common corner point or (ii) no common corner point.

In an embodiment, the one or more hardware processors are further configured by the instructions to determine a type of the scanned image as a pre-cropped scanned image or a normal scanned image based on the region of interest.

In an embodiment, the type of the scanned image is determined as the pre-cropped scanned image or the normal scanned image is based on a fourth comparison of (i) a difference between the region of interest and the scanned image and (ii) a predetermined threshold.

In yet another aspect, one or more non-transitory machine readable information storage mediums comprising one or more instructions which when executed by one or more hardware processors causes a method for extracting region of interest from scanned images and determining an associated image type thereof. The method comprises: obtaining, via one or more hardware processors, an input comprising a scanned image; resizing, via the one or more hardware processors, the obtained scanned image to obtain a resized image; partitioning, via the one or more hardware processors, the resized image into a pre-defined number of parts; classifying, via the one or more hardware processors, the resized image into a first class or a second class based on a property associated with a foreground and a background comprised in the pre-defined number of parts of the resized image to obtain a classified image; based on the classified image, obtaining a region of interest by performing one of: (i) converting, via the one or more hardware processors, the scanned image into a gray scale image and resizing the gray scale image to obtain a resized gray scale image; (ii) applying, via the one or more hardware processors, a first filtering technique on the resized gray scale image to obtain a first filtered image; (iii) applying, via the one or more hardware processors, a second filtering technique on the resized gray scaled image to obtain a second filtered image; (iv) obtaining, via the one or more hardware processors, an output image based on an intersection of the first filtered image and the second filtered image, wherein the output image comprises a plurality of black areas and a white area; (v) performing, via the one or more hardware processors, a first comparison of each black area from the plurality of black areas and the white area comprised in the obtained output image; and (vi) extracting, via the one or more hardware processors, the region of interest from the obtained output image based on the first comparison; or converting, via the one or more hardware processors, each part from the pre-defined number of parts into a Hue Saturation Value (HSV) space; calculating, via the one or more hardware processors, a mode color intensity of H channel and a mode color intensity of V channel comprised in the HSV space of each part in the pre-defined number of parts; performing, via the one or more hardware processors, a clustering technique on the mode color intensity of H channel and the mode color intensity of V channel to obtain a plurality of clusters; performing, via the one or more hardware processors, a second comparison of (i) one or more corner points of each cluster from the plurality of clusters and (ii) one or more corner points of the scanned image; and selecting, via the one or more hardware processors, a cluster from the plurality of clusters based on the second comparison, wherein the selected cluster serves as the region of interest, and wherein one or more parts of the pre-defined number of parts form the selected cluster.

In an embodiment, the step of classifying, via the one or more hardware processors, the resized image into a first class or a second class comprises: calculating an intensity of the grey channel space for each part and computing a difference in the intensities across the predefined number of parts; performing a third comparison of the difference with a predefined threshold; and classifying, based on the third comparison, the resized image into the first class or the second class to obtain the classified image.

In an embodiment, the step of extracting, via the one or more hardware processors, a region of interest from the obtained output image based on the first comparison comprises: concatenating two or more black areas from the plurality of black areas based on the first comparison to obtain a consolidated black area, wherein the two or more black areas are concatenated based on a corresponding presence within a predefined range, wherein the consolidated black area serves as the region of interest.

In an embodiment, the plurality of clusters is obtained based on an intersection of (i) an output of the clustering technique performed on the mode color intensity of H channel and (ii) an output of the clustering technique performed on the mode color intensity of V channel.

In an embodiment, the step of selecting a cluster from the plurality of clusters is based on there being (i) a single common corner point or (ii) no common corner point.

In an embodiment, the method further comprises determining, via the one or more hardware processors, a type of the scanned image as a pre-cropped scanned image or a normal scanned image based on the region of interest.

In an embodiment, the step of determining, via the one or more hardware processors, a type of the scanned image a pre-cropped scanned image or a normal scanned image is based on a fourth comparison of (i) a difference between the region of interest and the scanned image and (ii) a predetermined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
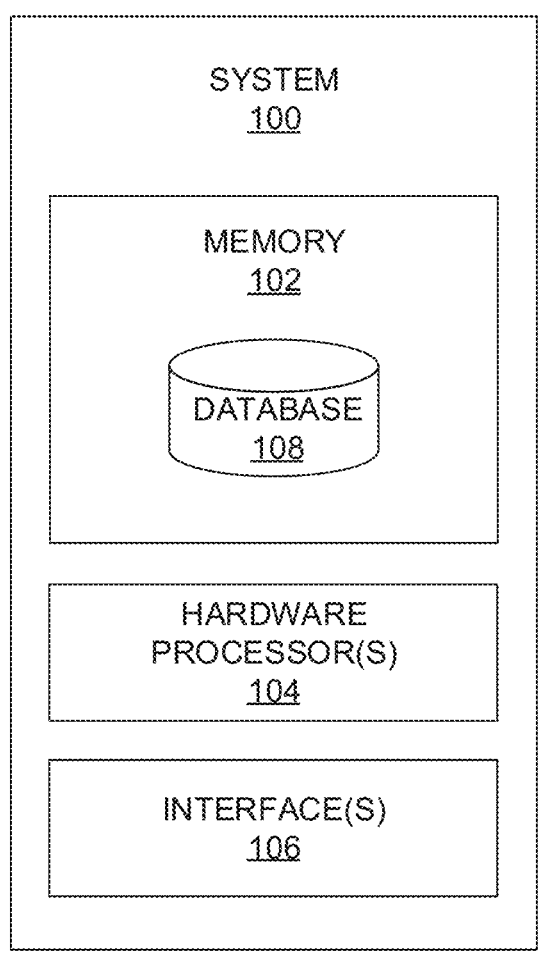
FIG. 1 depicts a system for extracting region of interest from scanned images and determining an associated image type thereof, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 5H, where similar reference characters denote corresponding features consistently throughout the figures, there are shown preferred embodiments and these embodiments are described in the context of the following exemplary system and/or method.

FIG. 1 depicts a system 100 for extracting region of interest from scanned images and determining an associated image type thereof, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises one or more scanned images or documents from which region of interest are extracted. The database 108 further stores information on various properties of images whether they have various predominant colors, resized properties, partitioned details, color intensity, and the like.

The information stored in the database 108 further comprises various techniques such as filtering technique as known in the art. Such filtering techniques include but are not limited to adaptive thresholding technique(s), median blurring technique(s), edge detection, image morphological technique(s), bounding box creating technique(s), clustering technique(s), image area calculation technique(s), and the like. The above-mentioned techniques comprised in the memory 102/database 108 are invoked as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
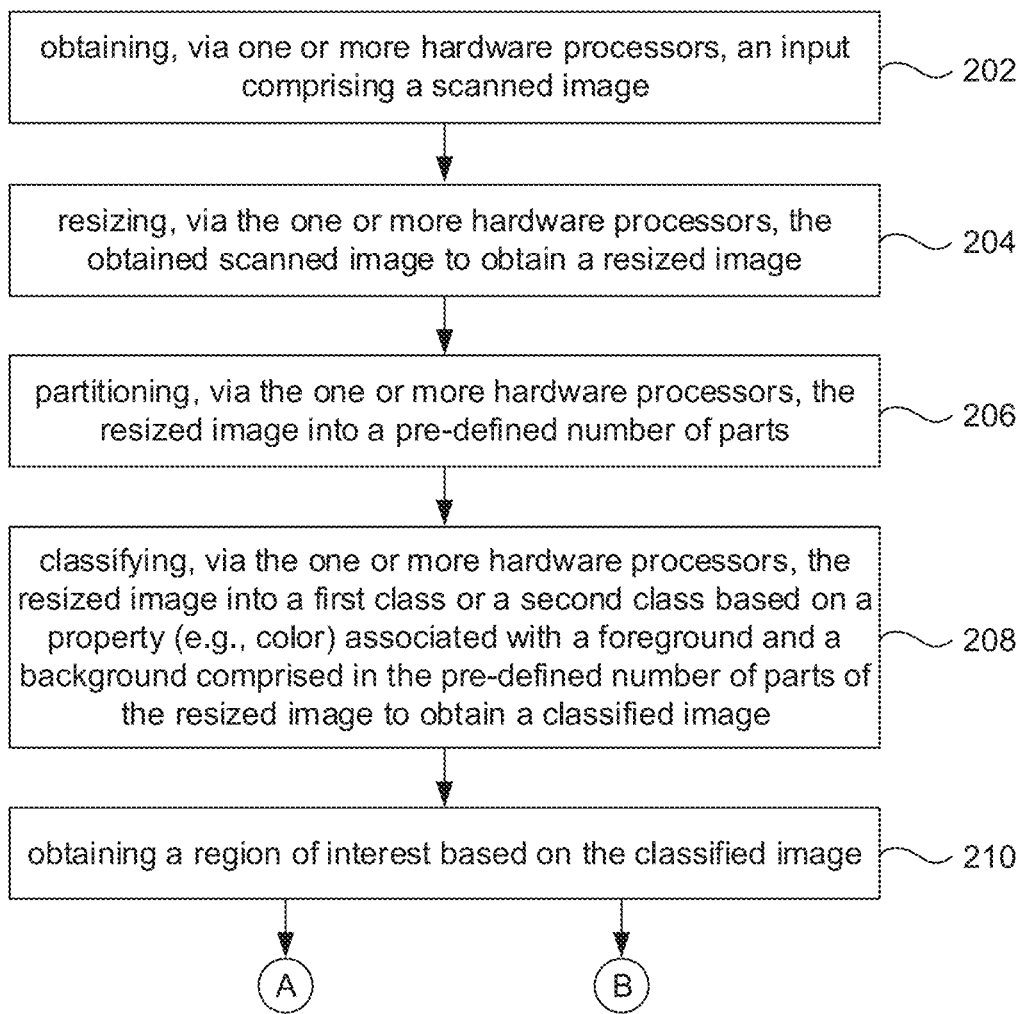
FIGS. 2A through 2C depict an exemplary flow chart illustrating a method for extracting region of interest from scanned images and determining an associated image type thereof, using the system 100 of FIG. 1, in accordance with an embodiment of the present disclosure.
Figure 2B:
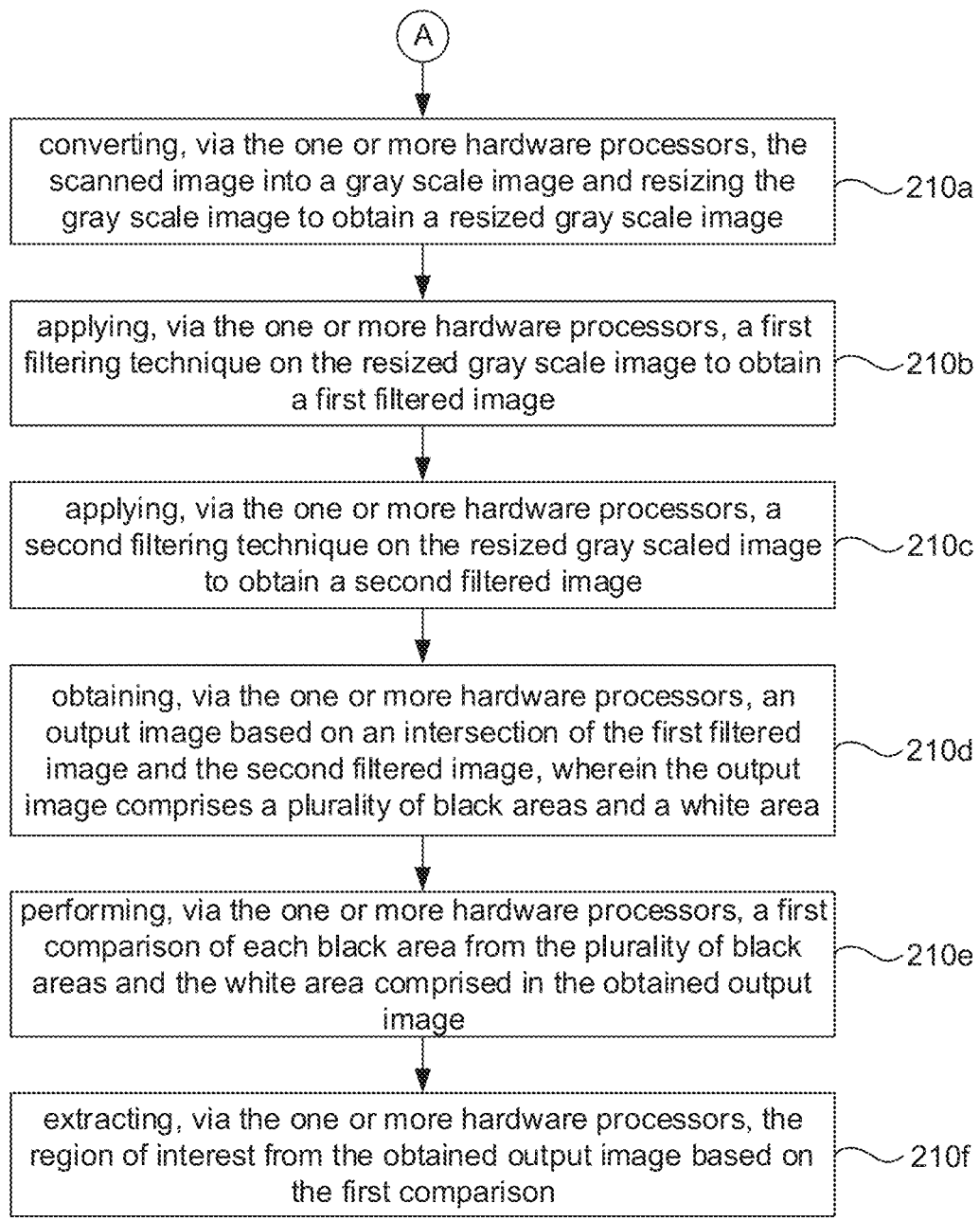
Figure 2C:
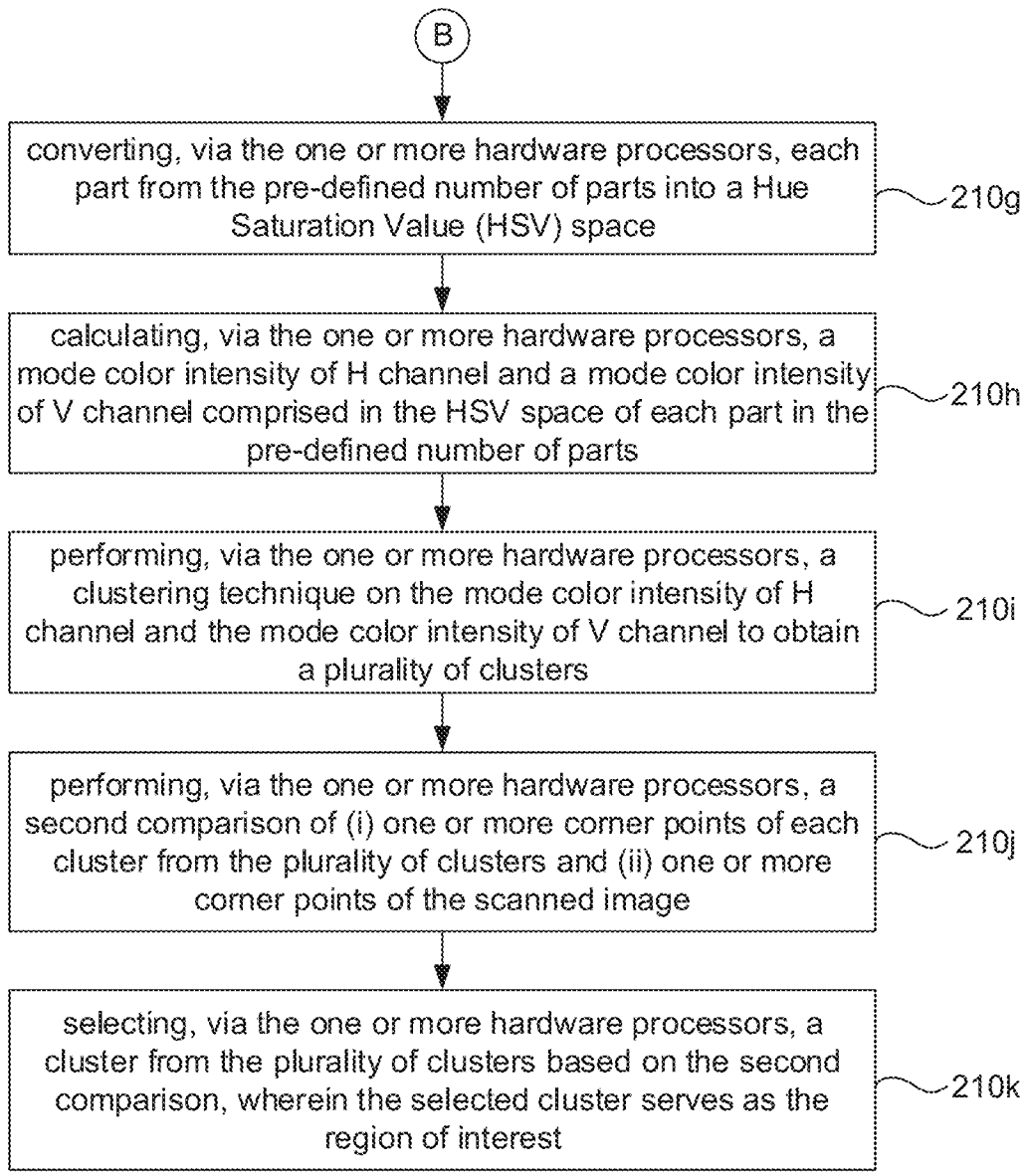
Figure 3A:
FIG. 3A depicts an exemplary scanned image received as an input by the system of FIG. 1, in accordance with an embodiment of the present disclosure.

FIGS. 2A through 2C, with reference to FIG. 1, depict an exemplary flow chart illustrating a method for extracting region of interest from scanned images and determining an associated image type thereof, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 obtain an input comprising a scanned image 302 as depicted in FIG. 3A. FIG. 3A, with reference to FIGS. 1 through 2C, depicts an exemplary scanned image received as an input by the system 100 of FIG. 1, in accordance with an embodiment of the present disclosure. For example, in the present disclosure, the system 100 receives an input scanned image 302 of an image size say 2250*4000 pixels. In an embodiment, the expression 'scanned image' may also be referred as 'input image', or 'image' and may be interchangeably used herein. The image may be in any file format as known in the art (e.g., jpeg, gif, png, jpg, bmp, and the like), in one example embodiment. The image may also be received in the form of a Portable Document Format (PDF), in another example embodiment.

Figure 3B:
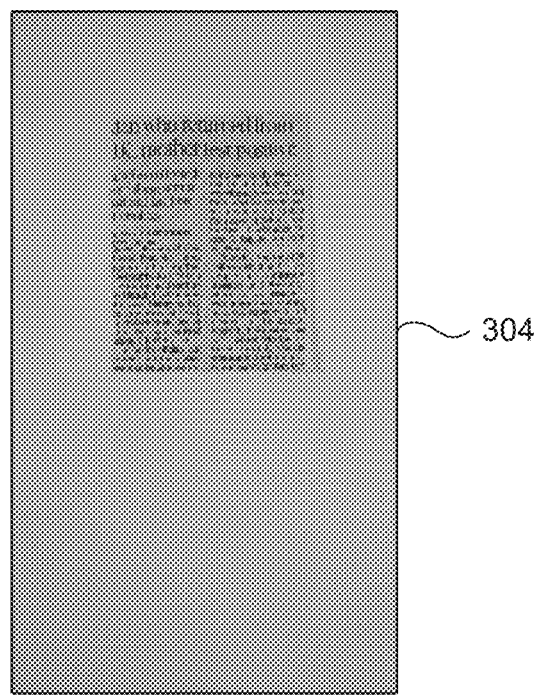
FIG. 3B depicts an exemplary resized image, in accordance with an embodiment of the present disclosure.

In an embodiment, at step 204 of the present disclosure, the one or more hardware processors 104 resize the obtained scanned image to obtain a resized image 304 as depicted in FIG. 3B. For example, the above scanned image having the image size 2250*4000 pixels is resized to obtain the resized image 304 with image size say 225*400 pixels. FIG. 3B, with reference to FIGS. 1 through 3A, depicts an exemplary resized image, in accordance with an embodiment of the present disclosure.

Figure 3C:
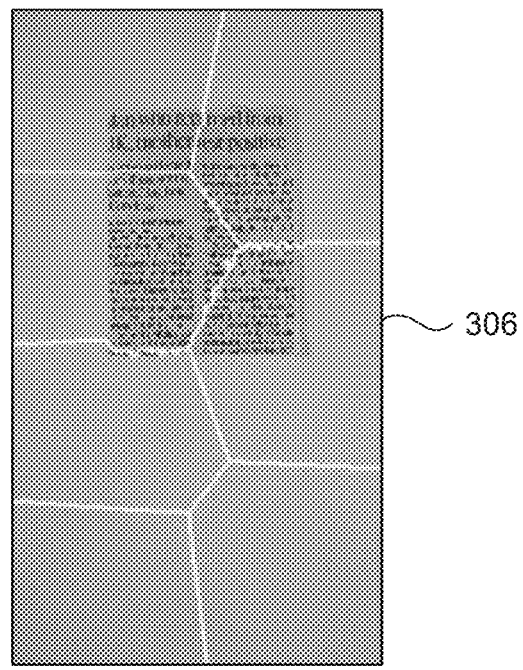
FIG. 3C depicts the exemplary resized image being partitioned into a pre-defined number of parts by the system of FIG. 1, in accordance with an embodiment of the present disclosure.

In an embodiment, at step 206 of the present disclosure, the one or more hardware processors 104 partition the resized image into a pre-defined number of parts. Such partitioning of the resized image into the pre-defined number of parts (306 as depicted in FIG. 3C) is based on visual perception of the image, in one example embodiment. FIG. 3C, with reference to FIGS. 1 through 3B, depicts an exemplary the resized image being partitioning into a pre-defined number of parts by the system 100 of FIG. 1, in accordance with an embodiment of the present disclosure. More specifically, FIG. 3C, depicts the resized image being partitioning into 9 parts (e.g., refer 306 as depicted in FIG. 3C), in one example embodiment of the present disclosure. It is to be understood by a person having ordinary skill in the art or person having skilled in the art that such partitioning of resized image into 9 parts shall not be construed as limiting the scope of the present disclosure and partitioning of the resized image can be done into any number of parts. In the present disclosure, Simple Linear Iterative Clustering (SLIC) Segmentation technique is executed by the system 100 to partition the resized Image into 9 parts. It is to be understood by a person having ordinary skill in the art or person having skilled in the art that example of such SLIC segmentation technique shall not be construed as limiting the scope of the present disclosure and partitioning of the resized image can be achieved by any segmentation/partitioning technique as known in the art.

In an embodiment, at step 208 of the present disclosure, the one or more hardware processors 104 classify the resized image into a first class or a second class based on a property (e.g., color) associated with a foreground and a background comprised in the pre-defined number of parts of the resized image to obtain a classified image. Class 1 Image refers to an image which contains only one predominant color whereas class 2 image refers to an image contains more than one predominant colors. Image(s) with very similar foreground and background colour are example of class 1 images such as identity proof documents (e.g., Aadhar card with white background). Images with different foreground and background colour are example of class 2 images such as Permanent Account Number (PAN) card (e.g., blue colour) on white background (e.g., when PAN card placed on white paper and scanned). The step of classifying, via the one or more hardware processors, the resized image into a first class or a second class comprises: converting each part from the predefined number of parts to a grey channel space; calculating an intensity of the grey channel space for each part and computing a difference in the intensities across the predefined number of parts; performing a comparison (also referred as a third comparison) of the difference with a predefined threshold; and classifying, based on the comparison (also referred as the third comparison), the resized image into the first class or the second class to obtain the classified image. For instance, the system 100 of the present disclosure calculates mode intensity for each segments/part say m1, m2, ..., mn, n<=9. D=max(m1, m2, ..., mn)−min(m1, m2, ..., mn), where D is the difference in the intensities across the parts. In the present disclosure, the predefined threshold (e.g., ε) say is 50. The difference D is compared with the predefined threshold ε. If the difference D is smaller than predefined threshold 50, then the scanned image/resized image is classified as a first class (e.g., also referred as first category, and interchangeably used herein), else it is classified into a second class (e.g., also referred as second category, and interchangeably used herein). The above description can be better understood by way of following Table 1. Below Table 1 depicts exemplary parts (also referred as 'segments' and interchangeably used herein) of the scanned image and gray channel (also referred as 'grey channel' and interchangeably used herein) being computed for each part. For the sake of brevity, only 7 parts/segments are depicted for better understanding of the embodiments of the present disclosure.

TABLE 1

| Part/<br>Segment_number | Parts/<br>segment | Grey channel |
|---|---|---|
| 0 | Part_0 | {'mode': 169} |
| 1 | Part_1 | {'mode': 170} |
| 2 | Part_2 | {'mode': 175} |
| 3 | Part_3 | {'mode': 178} |
| 4 | Part_4 | {'mode': 175} |
| 5 | Part_5 | {'mode': 173} |
| 6 | Part_6 | {'mode': 165} |

In the above Table 1, the grey channel intensity of Part_3 is 178 and grey channel intensity of Part_6 is 165. The difference in the grey channel intensity between Part_3 and Part_6 is 13, which is less than the pre-defined threshold (ε=50). Thus, the scanned image was classified as a first class image or the first category image.

In an embodiment, at step 210 of the present disclosure, the one or more hardware processors 104 obtain a region of interest based on the classified image by performing one of steps 210a through 210f or 210g through 210k. As the above scanned image is classified as the first category image, the steps 210a through 210f are performed for obtaining region of interest and are described herein below. In case, if the above scanned image is classified as the second category image, then the steps 210g through 210k are performed for obtaining the region of interest (described later in the below paragraphs).

Figure 4A:
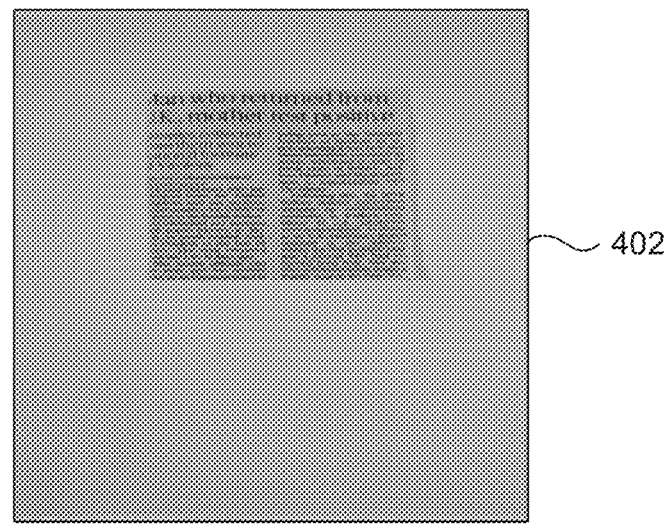
FIG. 4A depicts an exemplary resized grayscale image as outputted by the system 100 of FIG. 1, in accordance with an embodiment of the present disclosure.

In an embodiment, at step 210a of the present disclosure, the one or more hardware processors 104 convert the scanned image into a gray scale image and resize the gray scale image to obtain a resized gray scale image 402 as depicted in FIG. 4A. In an embodiment of the present disclosure, the expression 'gray scale' may also be referred as 'grayscale' or 'grey scale' or 'greyscale', and interchangeably used herein. The scanned image of step 202 is converted into grayscale and resized to 300*300 pixels. The horizontal and vertical factors (e.g., h_factor and w_factor respectively) are stored in the database 108 for further analysis and processing at later stage(s) as per the requirements. FIG. 4A, with reference to FIGS. 1 through 3C, depicts an exemplary resized grayscale image 402 as outputted by the system 100 of FIG. 1, in accordance with an embodiment of the present disclosure.

Figure 4B:
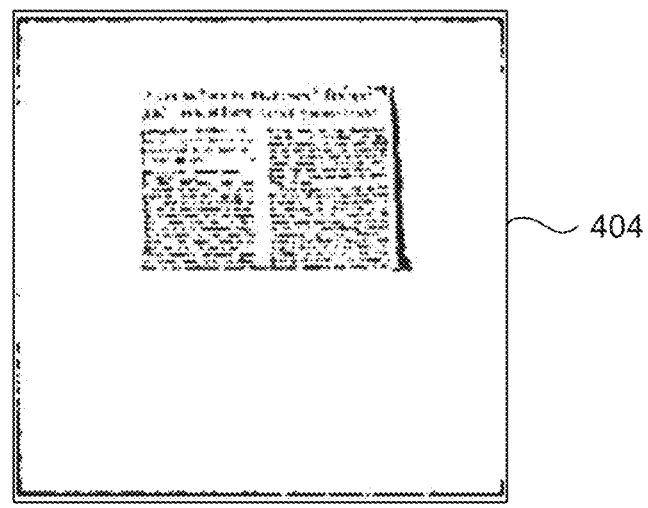
FIG. 4B depicts an exemplary first filtered image serving as an output upon applying the first filtering technique on the resized gray scale image, in accordance with an embodiment of the present disclosure.

In an embodiment, at step 210b of the present disclosure, the one or more hardware processors 104 apply a first filtering technique on the resized gray scale image 402 to obtain a first filtered image 404. FIG. 4B, with reference to FIGS. 1 through 4A, depicts an exemplary first filtered image outputted by the system 100 of FIG. 1, in accordance with an embodiment of the present disclosure. More specifically, the system 100 applies adaptive thresholding technique and followed by a median blur technique. Post applying the adaptive thresholding technique and the median blur technique, the system 100 outputs the first filtered image 404 as depicted in FIG. 4B. More specifically, FIG. 4B, with reference to FIGS. 1 through 4A, depicts the first filtered image 404 serving as an output upon applying the first filtering technique on the resized gray scale image 402, in accordance with an embodiment of the present disclosure. The first filtering technique comprises of adaptive threshold and median blur, in one example embodiment of the present disclosure. By applying adaptive threshold and median blur, the contrast of the resized grayscale image is enhanced, and all the edges appear to be prominent and visible.

Figure 4C:
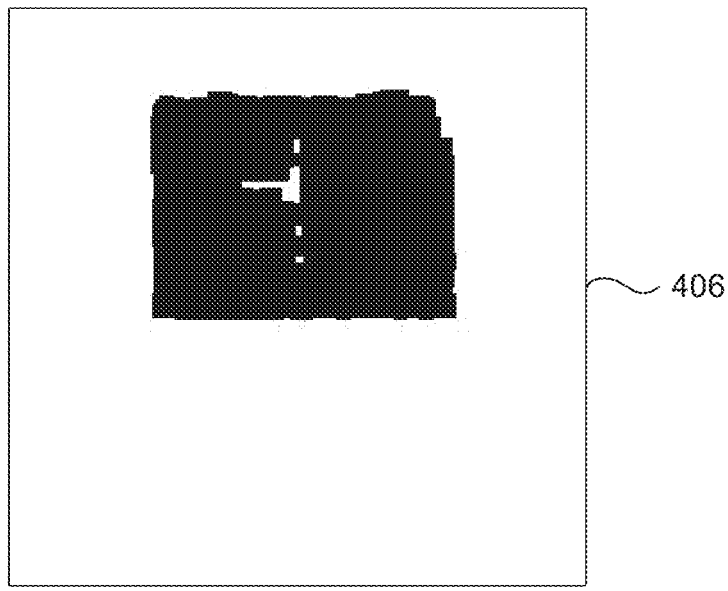
FIG. 4C depicts an exemplary second filtered image outputted by the system of FIG. 1, in accordance with an embodiment of the present disclosure.

In an embodiment, at step 210c of the present disclosure, the one or more hardware processors 104 apply a second filtering technique on the resized gray scaled image 402 to obtain a second filtered image 406 as depicted in FIG. 4C. FIG. 4C, with reference to FIGS. 1 through 4B, depicts an exemplary second filtered image 406 outputted by the system 100 of FIG. 1, in accordance with an embodiment of the present disclosure. More specifically, the system 100 detects one or more edges from grey scale image to obtain the second filtered image 406. The detected edges are thickened so that they merge together to form a dense cluster, in one example embodiment.

Figure 4D:
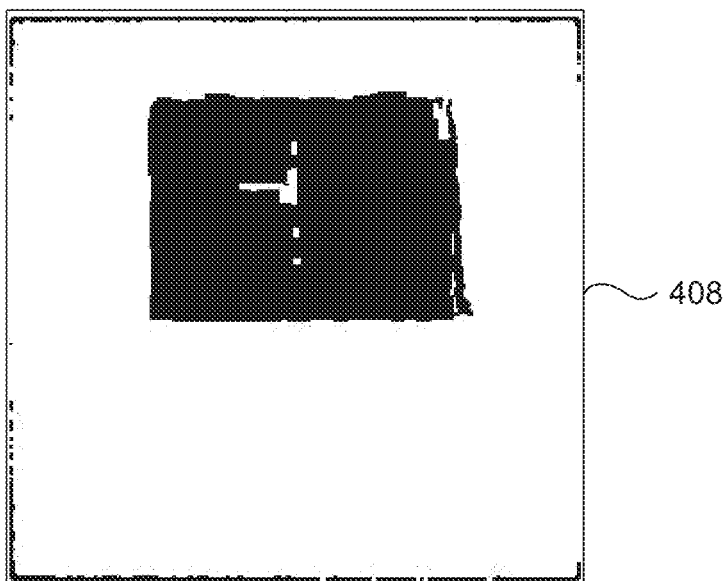
FIG. 4D depicts an exemplary output image comprises one or more black areas and white area, based on an intersection of the first filtered image and the second filtered image, in accordance with an embodiment of the present disclosure.

In an embodiment, at step 210d of the present disclosure, the one or more hardware processors 104 obtain an output image 408 based on an intersection of the first filtered image 404 and the second filtered image 406, wherein the output image comprises a plurality of black areas and a white area 408 as depicted in FIG. 4D. FIG. 4D, with reference to FIGS. 1 through 4C, depicts an exemplary output image 408 comprising a plurality of black areas and white area, based on the intersection of the first filtered image 404 and the second filtered image 406, in accordance with an embodiment of the present disclosure. FIG. 4D, with reference to FIGS. 1 through 4C, depicts an exemplary intersection of the first filtered image and the second filtered image, in accordance with an embodiment of the present disclosure.

Figure 4E:
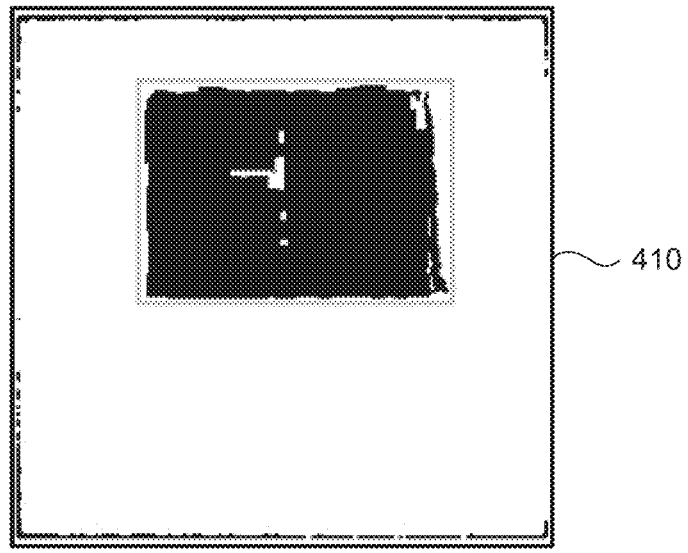
FIG. 4E depicts a larger black area with a bounding box being created around the larger black area by the system of FIG. 1, in accordance with an embodiment of the present disclosure.
Figure 4F:
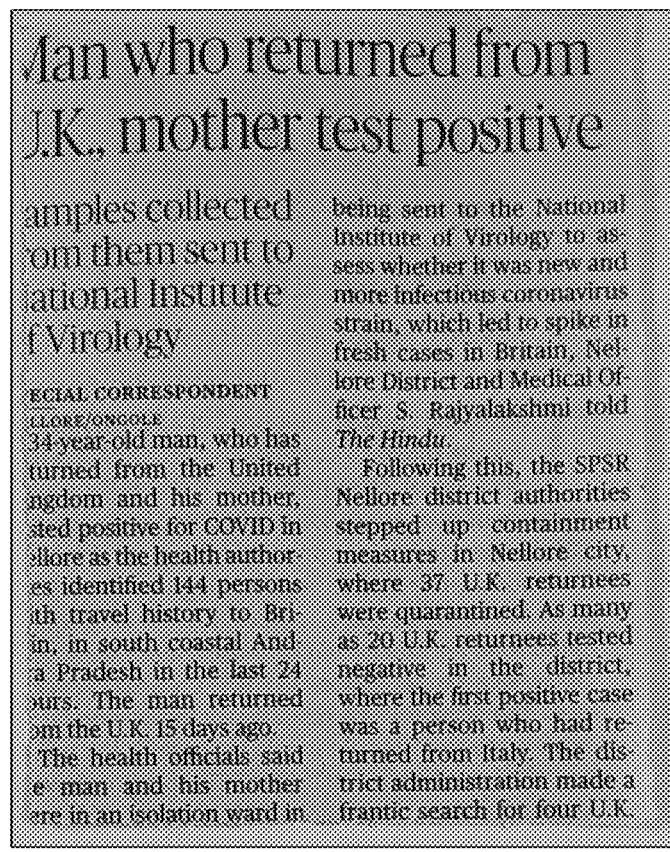
FIG. 4F depicts a region of interested being extracted from the scanned image by the system of FIG. 1, in accordance with an embodiment of the present disclosure.

In an embodiment, at step 210e of the present disclosure, the one or more hardware processors 104 perform a first comparison of each black are from the plurality of black areas and the white area comprised in the obtained output image. In an embodiment, at step 210f of the present disclosure, the one or more hardware processors 104 extract the region of interest from the obtained output image based on the first comparison. The step of extracting the region of interest based on the first comparison comprises concatenating two or more black areas from the plurality of black areas based on the first comparison to obtain a consolidated black area 410 as depicted in FIG. 4E. The two or more black areas are concatenated based on a corresponding presence within a predefined range. For instance, two or more black areas which lie in a specific/predefined range, say for example, between 3000 and 70000 are concatenated to obtain the consolidated black area. The consolidated black area serves as the region of interest 412 as depicted in FIG. 4F. The above steps of 210e and 210f are better understood by way of following description. The output image contains either black pixels (0) or white pixels (255), with count of white pixels greater than black pixels and accordingly image is outputted. Contours around the black pixels (wherein contours also referred as black areas and interchangeably used herein) are identified and area of each of the contours/black area is calculated wherein the contours/black areas having area in a specific range (e.g., [3000, 70000] are consolidated and concatenated. Example of such specific/predefined range shall not be construed as limiting the scope of the present disclosure. Further, the system 100 calculates/creates the bounding box around the consolidated black area/region (e.g., largest dark area). If the height and width of bounding box obtained is less than a specific value (e.g., 290), then accordingly region of interest identified for extraction. Example of such specific value shall not be construed as limiting the scope of the present disclosure. The bounding box is projected to original image (e.g., the scanned image received as input) using h_factor and w_factor which is returned by the system as extracted region of interest. The above step 210f is better understood by way of following exemplary explanation. As mentioned above, intersection of the first filtered image and the second filtered image is taken to obtain the output image. If area of dark region (which is basically the document region) in the output image is larger, then that region is a region of interest which is extracted from the original input image (e.g., also referred as the 'input image/scanned image). In particular, the system 100 takes the largest bounding box (e.g., bounding box being created by the system 100) enclosing all the dark regions which are significant i.e., which are not very small and lies in certain range (e.g., say [3000,70000] are consolidated and concatenated (experimentally determined)). If the height and width of the bounding box is less than a predetermined threshold (e.g., say 290 as per the experiment conducted by the present disclosure), then region of interest 412 as depicted in FIG. 4F is extracted accordingly.

There could be instances where there are black areas that are small, medium, and large, these black areas are consolidated/concatenated prior to creating a bounding box around these by the system 100. FIG. 4E, with reference to FIGS. 1 through 4D, depicts the larger/consolidated black area with a bounding box being created around the larger/consolidated black area 410 by the system 100 of FIG. 1, in accordance with an embodiment of the present disclosure. FIG. 4F, with reference to FIGS. 1 through 4E, depicts the region of interested being extracted from the scanned image by the system 100 of FIG. 1, in accordance with an embodiment of the present disclosure. In the experiments conducted by the embodiments of the present disclosure, the region of interest was outputted with a size of 1235*570 pixels.

Figure 5A:
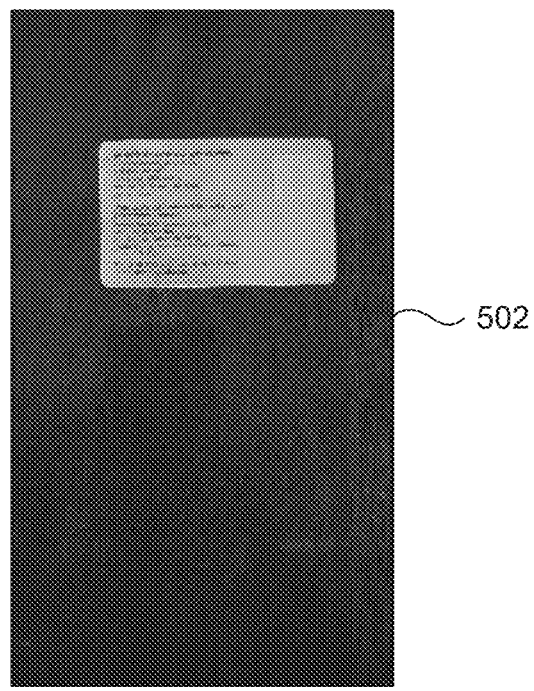
FIG. 5A depicts an exemplary second category resized image (also referred as scanned image), in accordance with an embodiment of the present disclosure.
Figure 5B:
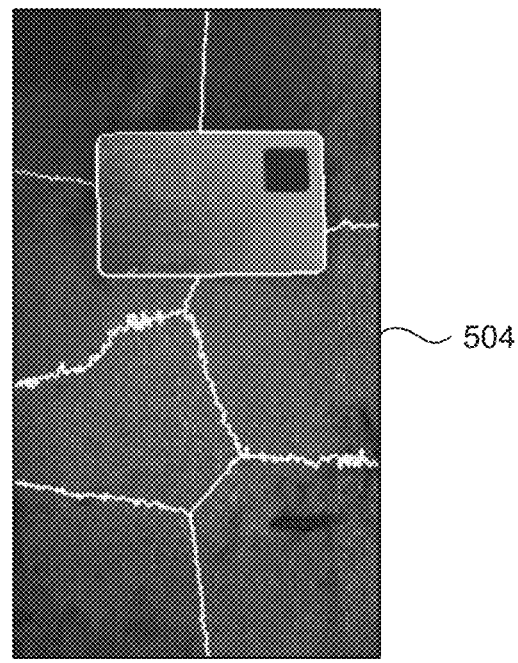
FIG. 5B depicts the exemplary second category resized image having the pre-defined number of parts, each part being converted into a Hue Saturation Value (HSV) space, in accordance with an embodiment of the present disclosure.

In case, at the step 208 of classification, the scanned image is classified as second class image (or second category image), then the steps 210g till 210k are performed which are discussed below. Since, the likelihood of classifying the same input scanned image into a second category is low or not possible by the system, for the sake of brevity and for better understanding of the embodiments of the present disclosure, the system 100 has considered another input scanned image which is assumed to be classified as second category image 502. The second category image 502 (e.g., say image of 2250*4000) is depicted in FIG. 5A. More specifically, FIG. 5A depicts an exemplary second category resized image (also referred as resized scanned image of 225*400), in accordance with an embodiment of the present disclosure. More specifically, second category image 502 is obtained as an input and resized to maintain aspect ratio and enable faster processing for region of interest extraction. Grey channel intensities of various parts of a resized input image (or a new input scanned image) were computed, wherein difference between various grey channel intensities was calculated and compared with a predefined threshold. For instance, Part_3 of the resized second category image was determined to be 165 and grey channel intensity of Part_7 was determined to be 25. The difference resulted in 140 which is greater than the predefined threshold, 50. Hence, the new input scanned image was classified as second category scanned image wherein the steps 210g till 210k were performed for region of interest extraction from the new input scanned image. Referring to steps of 210g till 210k, in an embodiment, at step 210g of the present disclosure, the one or more hardware processors 104 convert each part from the pre-defined number of parts into a Hue Saturation Value (HSV) space 504 as depicted in FIG. 5B. In an embodiment of the present disclosure, the pre-defined number of parts of the scanned image are converted into HSV color/space 504 as depicted in FIG. 5B. FIG. 5B, with reference to FIGS. 1 through 5A, depicts the exemplary second category resized image having the pre-defined number of parts, each part being converted into a Hue Saturation Value (HSV) space, in accordance with an embodiment of the present disclosure. Since, the color representations of the second category image are not depicted, the density of the grey space can be realized which corresponds to HSV space.

Figure 5C:
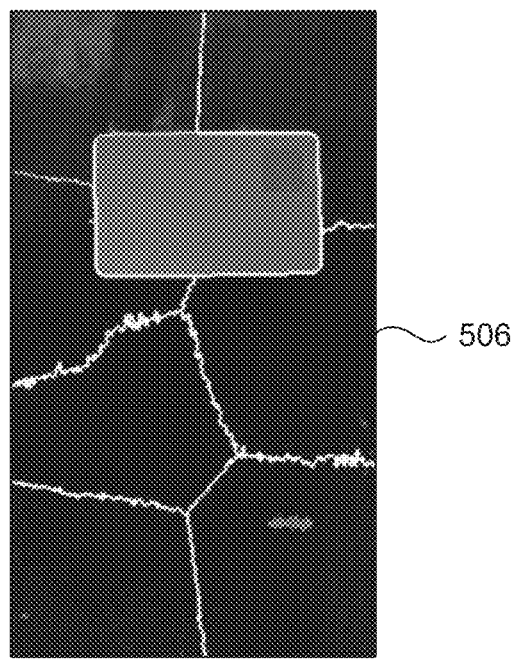
FIG. 5C depicts an exemplary a mode color intensity of H channel being calculated for each part, in accordance with an embodiment of the present disclosure.
Figure 5D:
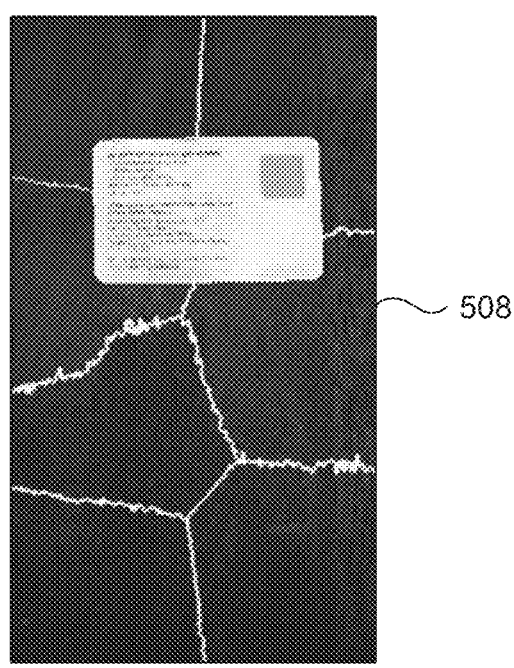
FIG. 5D depicts an exemplary a mode color intensity of V channel being calculated for each part, in accordance with an embodiment of the present disclosure.

In an embodiment, at step 210h of the present disclosure, the one or more hardware processors 104 calculate a mode color intensity of H channel 506 as depicted in FIG. 5C and a mode color intensity of V channel 508 as depicted in FIG. 5C comprised in the HSV space of each part in the pre-defined number of parts. More specifically, at step 210h, the HSV space of each part in the pre-defined number of parts is split into individual channels. and mode color intensity of H channel for each segment say h1, h2, . . . , hn, n<=9, and the mode color intensity of V channel for each segments say v1, v2, . . . , vn, n<=9 are calculated. FIG. 5C, with reference to FIGS. 1 through 5B, depict an exemplary a mode color intensity of H channel being calculated for each part 506, in accordance with an embodiment of the present disclosure. FIG. 5D, with reference to FIGS. 1 through 5C, depict an exemplary a mode color intensity of V channel being calculated for each part 508, in accordance with an embodiment of the present disclosure.

In an embodiment, at step 210i of the present disclosure, the one or more hardware processors 104 perform a clustering technique (e.g., k-means clustering technique) on the mode color intensity of H channel and the mode color intensity of V channel to obtain a plurality of clusters. In an embodiment, the plurality of clusters is obtained based on an intersection of (i) an output of the clustering technique performed on the mode color intensity of H channel and (ii) an output of the clustering technique performed on the mode color intensity of V channel. In other words, k-means clustering (for n=2) is performed separately using first the H channel mode intensities and then the V channel mode intensities of the parts. This result in creating two cluster of parts (based on proximity of mode value intensity) each for H and V channel, respectively. The plurality of clusters is then obtained by taking an intersection of the two clusters obtained from H and V channels. Below Table 2 depicts the mode color intensities for H channel and V channels, respectively.

TABLE 2

| Part/Segment_number | Parts/segment | H channel | V channel |
|---|---|---|---|
| 0 | Part_0 | {'mode': 34} | {'mode': 45} |
| 1 | Part_1 | {'mode': 30} | {'mode': 43} |
| 2 | Part_2 | {'mode': 101} | {'mode': 233} |
| 3 | Part_3 | {'mode': 21} | {'mode': 50} |
| 4 | Part_4 | {'mode': 11} | {'mode': 50} |
| 5 | Part_5 | {'mode': 8} | {'mode': 37} |
| 6 | Part_6 | {'mode': 13} | {'mode': 28} |
| 7 | Part_7 | {'mode': 13} | {'mode': 26} |

Figure 5E:
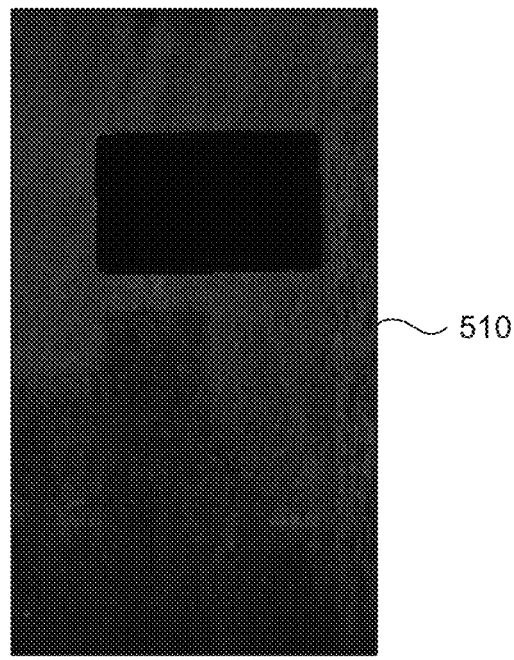
FIG. 5E depicts an exemplary output image of a cluster obtained upon performing the clustering technique on the mode color intensity of H channel and the mode color intensity of V channel, in accordance with an embodiment of the present disclosure.
Figure 5F:
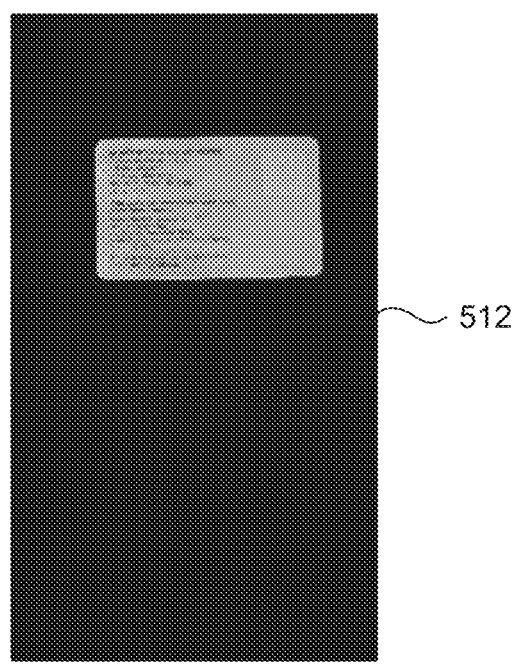
FIG. 5F depicts an exemplary output image of another cluster obtained upon performing the clustering technique on the mode color intensity of H channel and the mode color intensity of V channel, in accordance with an embodiment of the present disclosure.

Upon performing clustering technique on the mode color intensities of H and V channels, the clusters for H channel are as [0, 1, 3, 4, 5, 6, and 7] and [2] and the clusters for V channel are as [0, 1, 3, 4, 5, 6, and 7] and [2]. The final plurality of clusters 510 obtained is based on the intersection of the clusters of the H channel and V channel, which are [0, 1, 3, 4, 5, 6, and 7] and [2]. FIG. 5E, with reference to FIGS. 1 through 5D, depicts an exemplary output image of a cluster 510 obtained upon performing the clustering technique on the mode color intensity of H channel and the mode color intensity of V channel, in accordance with an embodiment of the present disclosure. FIG. 5F, with reference to FIGS. 1 through 5E, depicts an exemplary output image of another cluster 512 obtained upon performing the clustering technique on the mode color intensity of H channel and the mode color intensity of V channel, in accordance with an embodiment of the present disclosure.

Figure 5G:
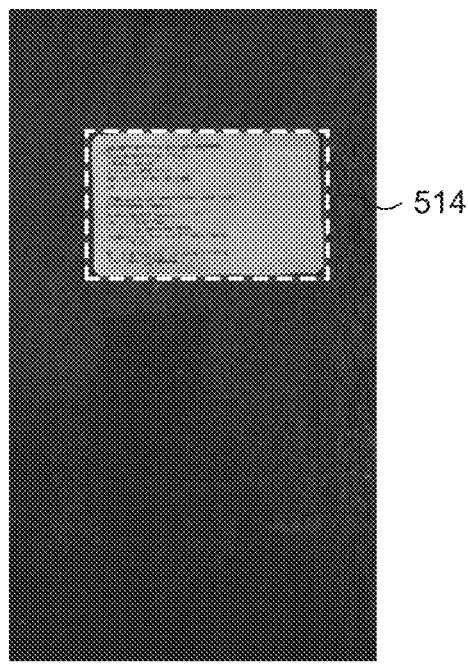
FIG. 5G depicts selection of a cluster amongst the plurality of clusters for region of interest extraction, in accordance with an embodiment of the present disclosure.
Figure 5H:
FIG. 5H depicts a region of interest being extracted or a cluster serving as the region of interest, in accordance with an embodiment of the present disclosure.

In an embodiment, at step 210j of the present disclosure, the one or more hardware processors 104 perform a second comparison of (i) one or more corner points of each cluster from the plurality of clusters and (ii) one or more corner points of the resized image. The one or more corner points of the clusters depicted in FIGS. 5E-5F are compared with the one or more corner points of the resized image depicted in FIG. 5A. In an embodiment, at step 210k of the present disclosure, the one or more hardware processors 104 select a cluster from the plurality of clusters based on the second comparison, wherein the selected cluster serves as the region of interest. In an embodiment, the selected cluster is the region of interest that is extracted from the whole image. In an embodiment, one or more parts (or at least a portion of the one or more parts) of the pre-defined number of parts form the selected cluster. In an embodiment, the step of selecting a cluster from the plurality of clusters is based on there being (i) a single common corner point or (ii) no common corner point. Based on the second comparison, it is evident that one or more corner points of cluster depicted in FIG. 5E matches the one or more corner points of the resized image of FIG. 5A. It is further evident that cluster depicted in FIG. 5F satisfies the criteria of (i) a single common corner point or (ii) no common corner point when compared with the resized image. More specifically, to decide which cluster, contain the actual document region, boundary point examination is performed. The document/image under consider can align with at most one corner of the input/resized image, or commonly it is located in the central region of the input image, in former case it has one common boundary point with respect to the input image or zero in the latter case. The cluster with one or less common corner points with the input/resized image is the cluster containing the region of interest and is accordingly extracted and the remaining cluster(s) is/are discarded. Thus, cluster depicted in FIG. 5F serves as region of interest. More specifically, FIG. 5G, with reference to FIGS. 1 through 5F, depicts selection of a cluster amongst the plurality of clusters for region of interest extraction, in accordance with an embodiment of the present disclosure. A bounding box 514 is then created for the selected cluster and the region of interest 516 is extracted as depicted in FIG. 5H. The bounding box is shown in FIG. 5G by way of dash line representation 514 (white dash line representation), in one embodiment of the present disclosure. More specifically, FIG. 5H, with reference to FIGS. 1 through 5G, depicts a region of interest 516 being extracted or a cluster serving as the region of interest, in accordance with an embodiment of the present disclosure. A fine-tuning technique (comprised in the memory 102) is applied to the region of interest 516 to further align the extracted region to be a rectangle (as documents are rectangle in shape). This removes the unwanted (extra) noise region in the extracted region of interest.

Once the region of interest 516 is extracted from the scanned image, the one or more hardware processors 104 determine a type of the scanned image as a pre-cropped scanned image or a normal scanned image based on the region of interest. The scanned image is identified as the pre-cropped scanned image or the normal scanned image is based on a fourth comparison of (i) a difference between the region of interest and the scanned image and (ii) a predetermined threshold. For instance, in the present disclosure, area of the region of interest extracted is calculated. Similarly, area of the input image (or scanned image) is calculated. Such area calculation is carried by the present disclosure by multiplying width and height of the image. If the difference in the area of the region of interest and the area of the input image (or scanned image) is less than predetermined threshold (e.g., say 7% of the input scanned image area), then the type of the scanned image is determined as the pre-cropped scanned image and the original scanned image as obtained at step 202 is outputted. If the difference in the area of the region of interest and the area of the input image (or scanned image) is greater than predetermined threshold (e.g., say 7% of the input scanned image area), then the type of the scanned image is determined as the normal scanned image and the region of interest that is extracted or cluster serving the region of interest is outputted. In the experiments conducted by the embodiments of the present disclosure, the region of interest of FIG. 4F of the first category image was outputted with a size of 12351570 pixels. Therefore, the area of the region of interest is calculated as 1938950, whereas area of the input scanned image is 9000000. The difference between the two areas is 7061050 which is 78.47% ((7061050/9000000)*100). The difference 78.47% is greater than 7% (predetermined threshold). Since the difference between the area of ROI extracted and the area of input image is greater than the predetermined threshold, the input scanned image is determined to be of normal scanned image and not a pre-cropped scanned image. Referring to FIG. 5H, in the experiments conducted by the embodiments of the present disclosure, the region of interest of the second category image was outputted with a size of 1422*986 pixels. Therefore, the area of the ROI 516 of FIG. 5H is 127112. The area of the input scanned image as depicted in 6A is 9000000. The difference between the two areas is 8872888 which is 85.84% ((127112/9000000)*100). The difference 85.84% is greater than 7% (predetermined threshold). Since the difference between the area of ROI extracted and the area of input image is greater than the predetermined threshold, the input scanned image is determined to be of normal scanned image and not a pre-cropped scanned image. In further experiments conducted by the present disclosure on yet another input scanned image (not shown in FIGS), the area of the ROI was 4911192. The area of the input scanned image was 4925232. The difference between the two areas is determined to be 14040 which is 0.28% ((14040/4925232)*100). The difference 0.28% is less than 7% (predetermined threshold). Since the difference between the area of ROI extracted and the area of input image is less than the predetermined threshold, the input scanned image is determined to be of a pre-cropped scanned image and not a normal scanned image.

There could be instances, where the scanned image is in the form of already a pre-cropped image. For example, say a pre-cropped image of size x*y (e.g., 2808*1754) is fed as an input to the system 100. The pre-cropped image is then resized to obtain a resized image 400*250. Once the resized image is obtained, the steps 206 and 210 are performed to extract region of interest wherein the steps 210a till 210f or steps 210g till 210k are accordingly performed for region of interest extraction depending upon output of step 208 wherein the scanned image is determined whether it falls under first category image or second category image. In an embodiment of the present disclosure, the expressions 'first comparison', 'second comparison', 'third comparison' and 'fourth comparison' shall not be construed with a literal meaning. Such comparison shall refer to a comparison occurring for an instance (e.g., single time) depending upon the steps being carried out by the method of the present disclosure. For instance, the expression 'second comparison' shall not be construed as comparing the same components second time, rather the second comparison is performed for components of that specific step being carried out by the method of the present disclosure described herein.

Embodiments of the present disclosure provide systems and methods for extracting region of interest from scanned image (or document) and further determining whether the scanned image is a pre-cropped image or a normal image. More specifically, the present disclosure detects region of interest for extraction in all types of images serving as input to the system 100, irrespective of foreground/background similarity or differences. Unlike conventional systems and methods which are template based, and use predefined bounding box, background color, etc., method of the present disclosure automatically extracts ROI from the scanned image without having to rely on any pre-defined templates, bounding boxes and/or background colors. Further, the present disclosure and its method has been time efficient in the way the scanned image are processed for ROI extraction using resized variant of the scanned images when compared to deep learning-based models (as training is required for deep learning-based models). Further, ROI extraction is done using the methods (e.g., refer steps 210a through 210f—method 1 and steps 210g through 210k—method 2) which improves the overall accuracy. Moreover, unlike conventional methods and systems which fail to process images with very similar foreground and background, or very narrow difference between foreground and background, present disclosure overcomes this technical problem/challenge by way of executing the method which is based on first category image (or refer steps 202 till 210f).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
    obtaining, via one or more hardware processors, an input comprising a scanned image;
    resizing, via the one or more hardware processors, the obtained scanned image to obtain a resized image;
    partitioning, via the one or more hardware processors, the resized image into a pre-defined number of parts based on visual perception of the image;
    classifying, via the one or more hardware processors, the resized image into a first class or a second class based on a property associated with a foreground and a background comprised in the pre-defined number of parts of the resized image to obtain a classified image, wherein classifying the resized image into the first class or the second class comprises:
        converting each part from the predefined number of parts to a grey channel space;
        calculating an intensity of the grey channel space for each part and computing a difference in the intensities across the predefined number of parts;
        performing a comparison of the difference with a predefined threshold; and
        classifying, based on the comparison, the resized image into the first class or the second class to obtain the classified image, wherein the resized image is classified as the first class if the difference is smaller than the predefined threshold and the resized image is classified as the second class if the difference is greater than the predefined threshold; and
    obtaining a region of interest based on the classified image being the first class by performing one of:
        (i) converting, via the one or more hardware processors, the scanned image into a gray scale image and resizing the gray scale image to obtain a resized gray scale image;
        (ii) applying, via the one or more hardware processors, a first filtering technique on the resized gray scale image to obtain a first filtered image;
        (iii) applying, via the one or more hardware processors, a second filtering technique on the resized gray scaled image to obtain a second filtered image, wherein one or more edges from the grey scale image is detected to obtain the second filtered image and wherein in the edges of the second filtered image are thickened so that the edges merge to form a dense cluster;
        (iv) obtaining, via the one or more hardware processors, an output image based on an intersection of the first filtered image and the second filtered image, wherein the output image comprises a plurality of black areas and a white area;
        (v) performing, via the one or more hardware processors, a first comparison of each black area from the plurality of black areas and the white area comprised in the obtained output image; and
        (vi) extracting, via the one or more hardware processors, the region of interest from the obtained output image based on the first comparison; or
    obtaining a region of interest based on the classified image (210) being the second class image by performing one of:
        (a) converting, via the one or more hardware processors, each part from the pre-defined number of parts into a Hue Saturation Value (HSV) space;
        (b) calculating, via the one or more hardware processors, a mode color intensity of H channel and a mode color intensity of V channel comprised in the HSV space of each part in the pre-defined number of parts;
        (c) performing, via the one or more hardware processors, a clustering technique on the mode color intensity of H channel and the mode color intensity of V channel to obtain a plurality of clusters, wherein the plurality of clusters is obtained based on an intersection of (i) an output of the clustering technique performed on the mode color intensity of H channel and (ii) an output of the clustering technique performed on the mode color intensity of V channel, wherein a k-means clustering is performed separately using the H channel mode intensities followed by V channel mode intensities of the parts;
        (d) performing, via the one or more hardware processors, a second comparison of (i) one or more corner points of each cluster from the plurality of clusters and (ii) one or more corner points of the scanned image; and
        (e) selecting, via the one or more hardware processors, a cluster from the plurality of clusters based on the second comparison, wherein the selected cluster serves as the region of interest, and wherein one or more parts of the pre-defined number of parts form the selected cluster.

2. The processor implemented method of claim 1, wherein the step of extracting, via the one or more hardware processors, a region of interest from the obtained output image based on the first comparison comprises:
    concatenating two or more black areas from the plurality of black areas based on the first comparison to obtain a consolidated black area, wherein the two or more black areas are concatenated based on a corresponding presence within a predefined range, wherein the consolidated black area serves as the region of interest.

3. The processor implemented method of claim 1, wherein the step of selecting a cluster from the plurality of clusters is based on there being (i) a single common corner point or (ii) no common corner point.

4. The processor implemented method of claim 1, further comprising determining, via the one or more hardware processors, a type of the scanned image as a pre-cropped scanned image or a normal scanned image based on the region of interest.

5. The processor implemented method of claim 4, wherein the step of determining, via the one or more hardware processors, a type of the scanned image a pre-cropped scanned image or a normal scanned image is based on a fourth comparison of (i) a difference between the region of interest and the scanned image and (ii) a predetermined threshold, wherein if the difference in the area of the region of interest and the area of the scanned image is less than predetermined threshold then the type of the scanned image is determined as the pre-cropped scanned image and if the difference in the area of the region of interest and the area of the scanned image is greater than predetermined threshold then the type of the scanned image is determined as the normal scanned image.

6. A system, comprising:
a memory storing instructions;
one or more communication interfaces; and
one or more hardware processors coupled to the memory via the one or more communication interfaces, wherein the one or more hardware processors are configured by the instructions to:
obtain an input comprising a scanned image;
resize the obtained scanned image to obtain a resized image based on visual perception of the image;
partition the resized image into a pre-defined number of parts;
classify the resized image into a first class or a second class based on a property associated with a foreground and a background comprised in the pre-defined number of parts of the resized image to obtain a classified image, wherein classifying the resized image into the first class or the second class comprises:
converting each part from the predefined number of parts to a grey channel space;
calculating an intensity of the grey channel space for each part and computing a difference in the intensities across the predefined number of parts;
performing a comparison of the difference with a predefined threshold; and
classifying, based on the comparison, the resized image into the first class or the second class to obtain the classified image, wherein the resized image is classified as the first class if the difference is smaller than the predefined threshold and the resized image is classified as the second class if the difference is greater than the predefined threshold; and
obtain a region of interest based on the classified image being the first class by performing one of:
(i) converting the scanned image into a gray scale image and resizing the gray scale image to obtain a resized gray scale image;
(ii) applying a first filtering technique on the resized gray scale image to obtain a first filtered image;
(iii) applying a second filtering technique on the resized gray scaled image to obtain a second filtered image, wherein one or more edges from the grey scale image is detected to obtain the second filtered image and wherein in the edges of the second filtered image are thickened so that the edges merge to form a dense cluster;
(iv) obtaining an output image based on an intersection of the first filtered image and the second filtered image, wherein the output image comprises a plurality of black areas and a white area;
(v) performing a first comparison of each black area from the plurality of black areas and the white area comprised in the obtained output image; and
(vi) extracting the region of interest from the obtained output image based on the first comparison; or
obtaining a region of interest based on the classified image (210) being the second class image by performing one of:
(a) converting each part from the pre-defined number of parts into a Hue Saturation Value (HSV) space;
(b) calculating a mode color intensity of H channel and a mode color intensity of V channel comprised in the HSV space of each part in the pre-defined number of parts;
(c) performing a clustering technique on the mode color intensity of H channel and the mode color intensity of V channel to obtain a plurality of clusters, wherein the plurality of clusters is obtained based on an intersection of (i) an output of the clustering technique performed on the mode color intensity of H channel and (ii) an output of the clustering technique performed on the mode color intensity of V channel, wherein a k-means clustering is performed separately using the H channel mode intensities followed by V channel mode intensities of the parts;
(d) performing a second comparison of (i) one or more corner points of each cluster from the plurality of clusters and (ii) one or more corner points of the scanned image; and
(f) (e) selecting a cluster from the plurality of clusters based on the second comparison, wherein the selected clusters serving as the region of interest, and wherein one or more parts of the pre-defined number of parts for the selected cluster.

7. The system of claim 6, wherein the step of extracting, via the one or more hardware processors, a region of interest from the obtained output image based on the first comparison comprises:
concatenating two or more black areas from the plurality of black areas based on the first comparison to obtain a consolidated black area, wherein the two or more black areas are concatenated based on a corresponding presence within a predefined range, wherein the consolidated black area serves as the region of interest.

8. The system of claim 6, wherein the cluster is selected from the plurality of clusters based on there being (i) a single common corner point or (ii) no common corner point.

9. The system of claim 6, wherein the one or more hardware processors are further configured by the instructions to determine a type of the scanned image as a pre-cropped scanned image or a normal scanned image based on the region of interest.

10. The system of claim 9, wherein the type of the scanned image is determined as the pre-cropped scanned image or the normal scanned image is based on a fourth comparison of (i) a difference between the region of interest and the scanned image and (ii) a predetermined threshold, wherein if the difference in the area of the region of interest and the area of the scanned image is less than predetermined threshold then the type of the scanned image is determined as the pre-cropped scanned image and if the difference in the area of the region of interest and the area of the scanned image is greater than predetermined threshold then the type of the scanned image is determined as the normal scanned image.

11. One or more non-transitory machine readable information storage mediums comprising one or more instructions which when executed by one or more hardware processors causes a method for extracting region of interest from scanned images and determining an associated image type thereof by:
   obtaining, via the one or more hardware processors, an input comprising a scanned image;
   resizing, via the one or more hardware processors, the obtained scanned image to obtain a resized image based on visual perception of the image;
   partitioning, via the one or more hardware processors, the resized image into a pre-defined number of parts;
   classifying, via the one or more hardware processors, the resized image into a first class or a second class based on a property associated with a foreground and a background comprised in the pre-defined number of parts of the resized image to obtain a classified image, wherein classifying the resized image into the first class or the second class comprises:
      converting each part from the predefined number of parts to a grey channel space;
      calculating an intensity of the grey channel space for each part and computing a difference in the intensities across the predefined number of parts;
      performing a comparison of the difference with a predefined threshold; and
   classifying, based on the comparison, the resized image into the first class or the second class to obtain the classified image, wherein the resized image is classified as the first class if the difference is smaller than the predefined threshold and the resized image is classified as the second class if the difference is greater than the predefined threshold; and
   obtaining a region of interest based on the classified image being the first class by performing one of:
      (i) converting, via the one or more hardware processors, the scanned image into a gray scale image and resizing the gray scale image to obtain a resized gray scale image;
      (ii) applying, via the one or more hardware processors, a first filtering technique on the resized gray scale image to obtain a first filtered image;
      (iii) applying, via the one or more hardware processors, a second filtering technique on the resized gray scaled image to obtain a second filtered image, wherein one or more edges from the grey scale image is detected to obtain the second filtered image and wherein in the edges of the second filtered image are thickened so that the edges merge to form a dense cluster;
      (iv) obtaining, via the one or more hardware processors, an output image based on an intersection of the first filtered image and the second filtered image, wherein the output image comprises a plurality of black areas and a white area;
      (v) performing, via the one or more hardware processors, a first comparison of each black area from the plurality of black areas and the white area comprised in the obtained output image; and
      (vi) extracting, via the one or more hardware processors, the region of interest from the obtained output image based on the first comparison; or
   obtaining a region of interest based on the classified image (210) being the second class image by performing one of:
      (a) converting, via the one or more hardware processors, each part from the pre-defined number of parts into a Hue Saturation Value (HSV) space;
      (b) calculating, via the one or more hardware processors, a mode color intensity of H channel and a mode color intensity of V channel comprised in the HSV space of each part in the pre-defined number of parts;
      (c) performing, via the one or more hardware processors, a clustering technique on the mode color intensity of H channel and the mode color intensity of V channel to obtain a plurality of clusters, wherein the plurality of clusters is obtained based on an intersection of (i) an output of the clustering technique performed on the mode color intensity of H channel and (ii) an output of the clustering technique performed on the mode color intensity of V channel, wherein a k-means clustering is performed separately using the H channel mode intensities followed by V channel mode intensities of the parts;
      (d) performing, via the one or more hardware processors, a second comparison of (i) one or more corner points of each cluster from the plurality of clusters and (ii) one or more corner points of the scanned image; and
      (e) selecting, via the one or more hardware processors, a cluster from the plurality of clusters based on the second comparison, wherein the selected cluster serves as the region of interest, and wherein one or more parts of the pre-defined number of parts form the selected cluster.

12. The one or more non-transitory machine readable information storage mediums of claim 11, wherein the step of extracting, via the one or more hardware processors, a region of interest from the obtained output image based on the first comparison comprises:
   concatenating two or more black areas from the plurality of black areas based on the first comparison to obtain a consolidated black area, wherein the two or more black areas are concatenated based on a corresponding presence within a predefined range, wherein the consolidated black area serves as the region of interest.

13. The one or more non-transitory machine readable information storage mediums of claim 11, wherein the step of selecting a cluster from the plurality of clusters is based on there being (i) a single common corner point or (ii) no common corner point.

14. The one or more non-transitory machine readable information storage mediums of claim 11, wherein the method further comprises determining, via the one or more hardware processors, a type of the scanned image as a pre-cropped scanned image or a normal scanned image based on the region of interest.

15. The one or more non-transitory machine readable information storage mediums of claim 11, wherein the method further comprises:
   determining, via the one or more hardware processors, a type of the scanned image as a pre-cropped scanned image or a normal scanned image based on the region of interest; and wherein the step of determining, via the one or more hardware processors, a type of the scanned image a pre-cropped scanned image or a normal scanned image is based on a fourth comparison of (i) a difference between the region of interest and the scanned image and (ii) a predetermined threshold, wherein if the difference in the area of the region of interest and the area of the scanned image is less than predetermined threshold then the type of the scanned image is determined as the pre-cropped scanned image and if the difference in the area of the region of interest and the area of the scanned image is greater than predetermined threshold then the type of the scanned image is determined as the normal scanned image.

* * * * *